Jan. 2, 1951 E. WEISHAAR 2,536,790
PLANTER VALVE
Filed May 24, 1945 3 Sheets-Sheet 3
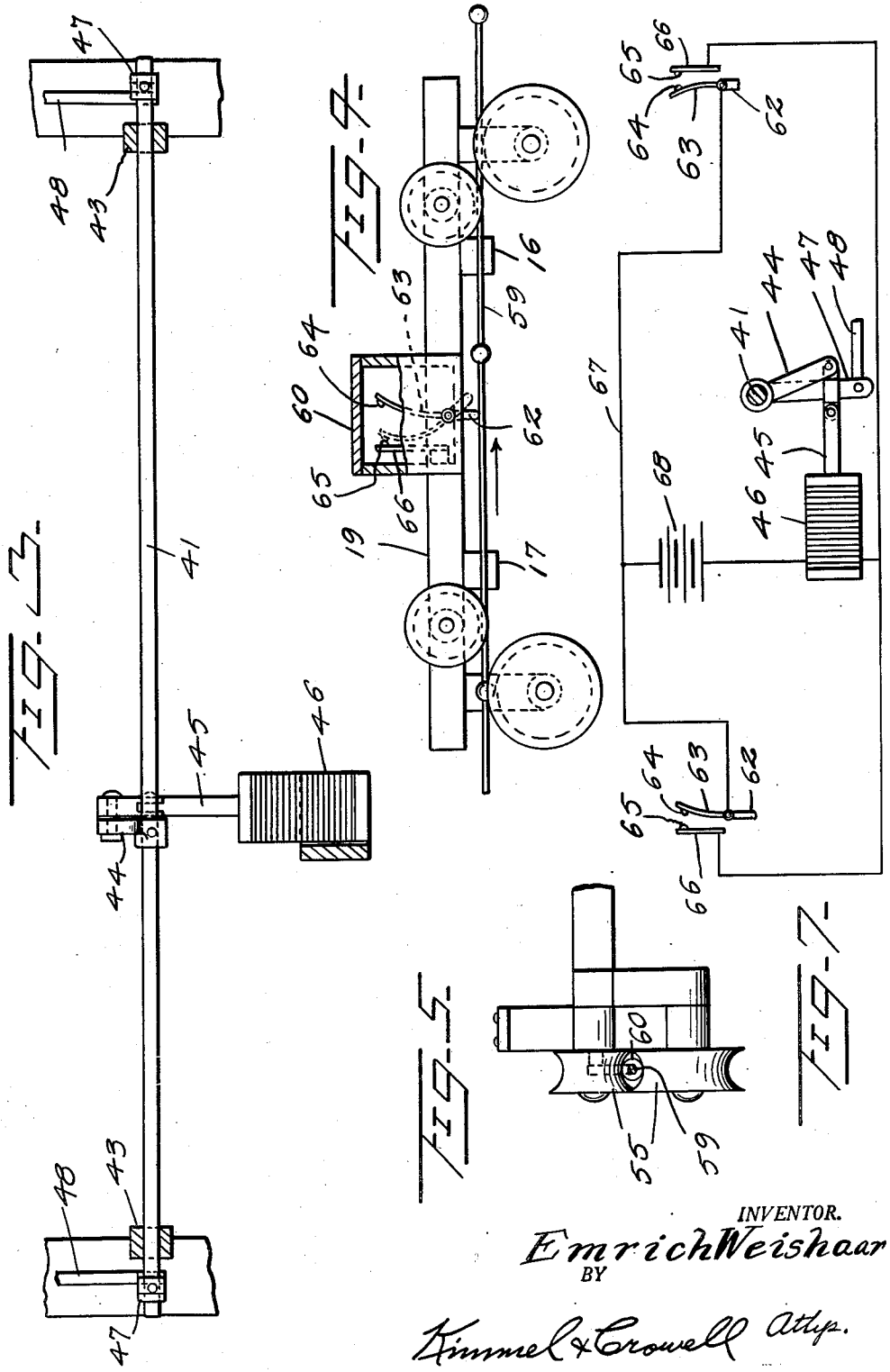
INVENTOR.
Emrich Weishaar
BY
Kimmel & Crowell Attys.

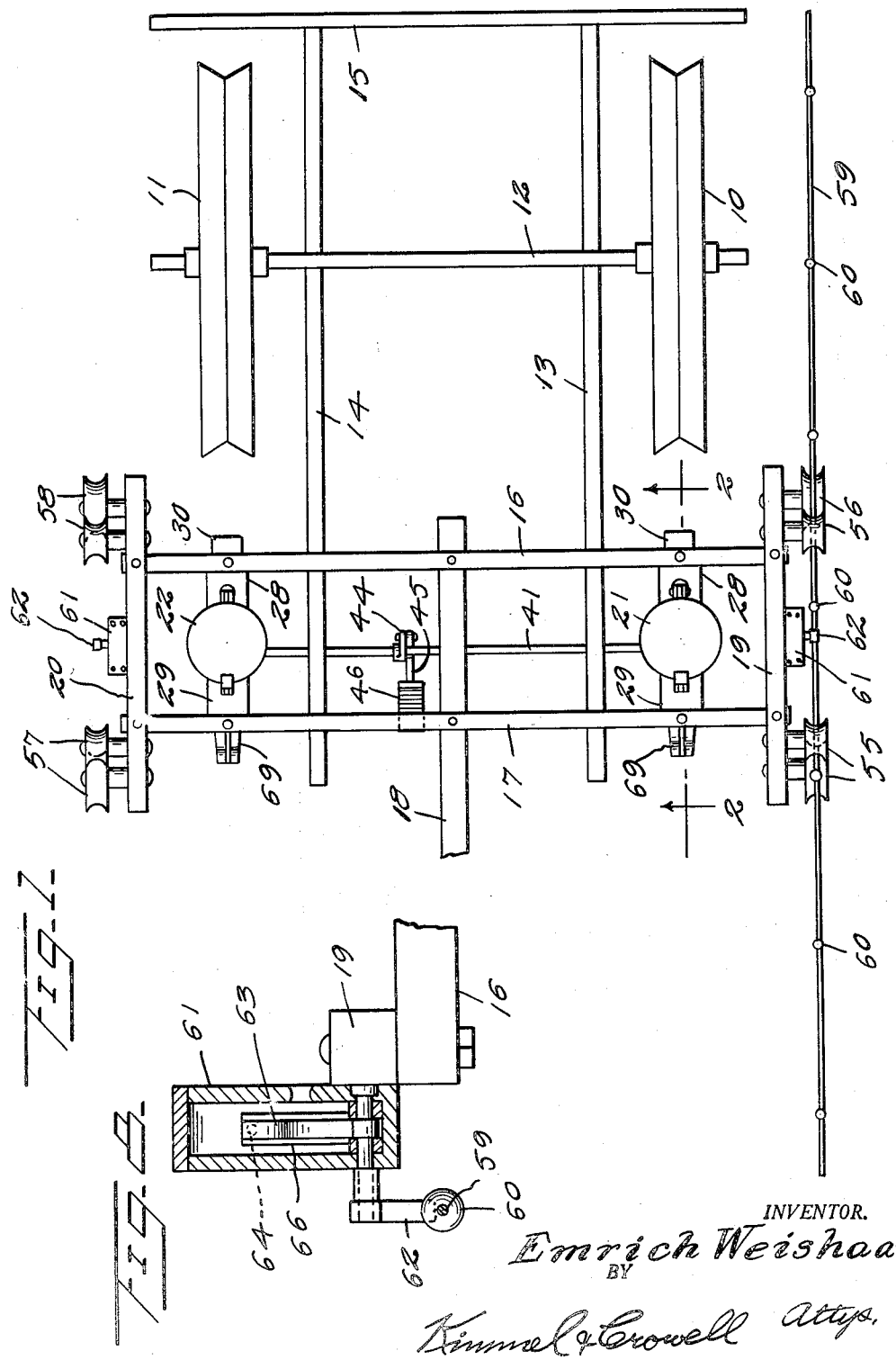

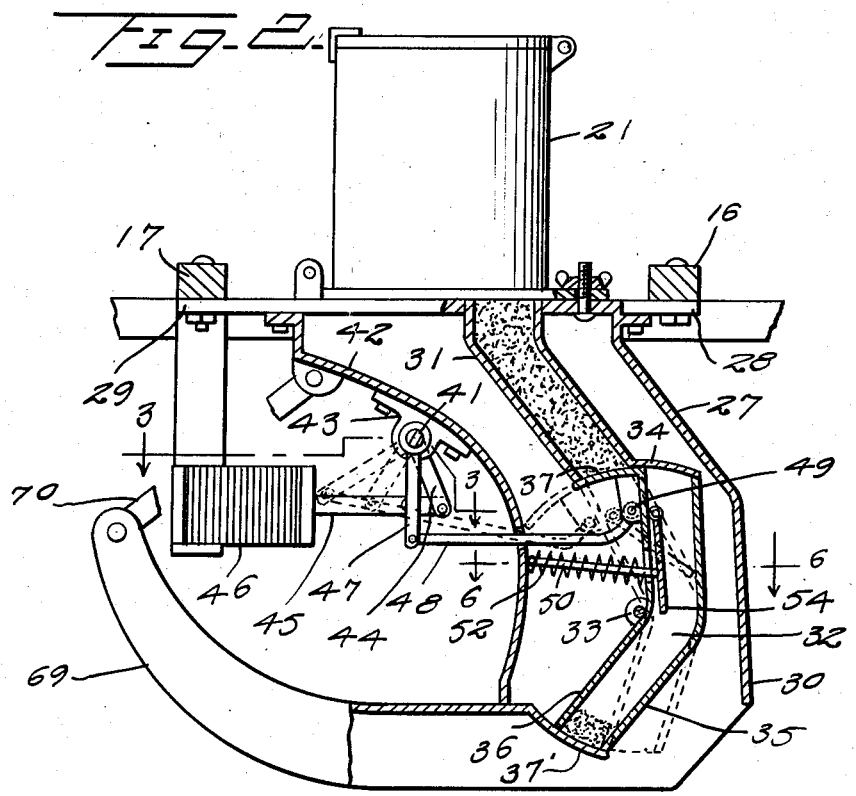
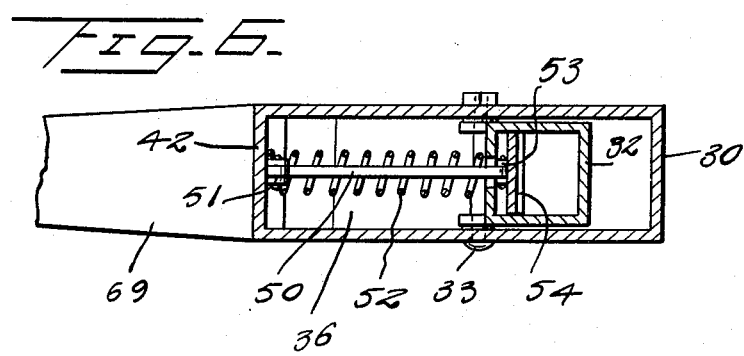

Patented Jan. 2, 1951

2,536,790

UNITED STATES PATENT OFFICE 2,536,790

PLANTER VALVE

Emrich Weishaar, Ashton, Ill.

Application May 24, 1945, Serial No. 595,580

2 Claims. (Cl. 111—51)

This invention relates to seed planters and especially to corn planters.

One of its objects is to provide an accurate corn planting means that is automatic in operation.

Another object is to provide a corn planter that electrically controls the seed feeding to the planter, from a hopper.

Another object is to provide a means for accumulating seed in a position to be readily dropped in a furrow.

Another object is to provide a means for electrically accumulating and releasing the seed.

The manner of accomplishment of these and other objects, which will appear hereinafter, will become apparent from a reading of the specification, taken in connection with the accompanying drawings, in which Figure 1 is a top plan view of the planter, Figure 2 is a section taken on line 2—2 of Figure 1, Figure 3 is a section taken on line 3—3 of Figure 2, Figure 4 illustrates the switch actuating means, Figure 5 is a detail view illustrating the support means for the switch actuating means, Figure 6 is a sectional view, taken on the line 6—6 of Figure 2, Figure 7 is a diagrammatic view of the electrical actuating means and, Figure 8 is a detail view of the switch.

Referring now to the drawings, the wheels 10 and 11 located at the rear end of the planter are positioned on the axle 12 which supports the side beams 13 and 14, which are connected at their rear ends by the cross member 15. Transverse of and at the forward ends of the beams 13 and 14 are the cross members 16 and 17 which support at their center the tractor hitch 18.

The outer ends of the transverse members 16 and 17 are connected by the members 19 and 20. Intermediate these members are arranged the seed hoppers 21 and 22 and by reference to Figure 2 the operation of the seed dispensing means will be clearly understood. Below the hopper and depending from the frame is a hollow shoe supporting casing 27 which is supported at its rear end and front end 28 and 29, respectively, by the cross members 16 and 17, respectively. Casing 27 may be made in one piece or in sections, depending on the most economical and convenient manner of making it. A guard member 30 forms the outer portion of the casing 27 and forwardly thereof is an outlet tube 31 leading from the hopper 21 and below said outlet tube is a tubular delivery conduit 32 mounted intermediate its ends for pivotal movement on a pivot 33, the top of the conduit being closed in one position, as by a flange 34, said flange being attached to, or made a part of the outlet tube 31, while the conduit 32 also has integral therewith at its top and forward side 36 an arcuate flange 37. Flange 37 forms a closure for outlet tube 31 in the position of the device in which flange 34 closes the upper end of the conduit 32. In this position also the lower end of conduit 32 is closed by an arcuate flange 37' comprising an integral part of a shoe 69, to be more fully described hereinafter.

The closure 37 acts as a valve to shut off the flow of seed from the hopper at the lower end of the outlet 31. The sections 35 and 36 of the conduit 32 are operated as a unit by an electrical arrangement which will be described hereinafter.

A cross shaft 41 is supported at its ends by the apron 42 of the frame 27 through means of the retaining elements 43. Attached, intermediate the ends of the rod, is a crankarm 44 the free end of which is pivoted to the outer end of the pusher 45 of the solenoid 46 which may be suspended from the cross member 17. Fastened to the ends of the shaft 41 are crankarms 47 having pivoted at their lower ends the links 48, which are attached at 49 to the section 36 of the conduit 32. Positioned below the rearward end of the link 48 is a rod 50 which is held in a socket 51, Figure 6, attached to the apron 42, one end of a spring 52 being seated around the socket, the other end of said rod being positioned in a socket 53 which is attached to a check valve 54 and the corresponding end of said spring acting to pull said flap valve toward the section 36 of the conduit.

On the outer sides of the members 19 and 20, Figure 1, are located the guide rollers, arranged in pairs, 55, 56, 57 and 58, respectively, rotatably mounted on suitable shafts. The rollers are arranged to have passed therebetween a line 59, preferably wire, having equally spaced buttons 60 thereon which while passing under a switch 61 will bear against the lower arm 62 of the pivoted member 63 thus causing the point 64 to contact with the point 65 of the terminal 66 thereby closing the circuit. The wires 67 lead from the usual storage battery 68 of the tractor.

The pivoted member 63 is spring pressed, in any convenient manner, to return it to its open position.

Operation

The operation of the planter is as follows: Seed from the hopper will feed into outlet 31 and at the lower end thereof the seed will be retained by the closure 37 and when this closure is opened by means of the solenoid 46, and the intermediate parts, already described, the seed will be deposited in a reservoir below said outlet. The same action that closes the outlet 31 will move the conduit 32 to a position for reception of the seed through the valve 54. The seed will then be deposited in said conduit and be allowed to pass to a furrow through the bottom opening thereof.

The shoe or furrow opener 69 is of any conventional type and may be adjustably arranged at its forward end by means of a link arrangement 70, its rear end being pivoted in any convenient manner.

While I have illustrated two seed hoppers, any number of same may be utilized.

There has been described and illustrated the preferred embodiment of the invention but various changes and modifications may be made within the scope of the invention whereby, any type of seed may be planted.

What I claim is:

1. A seed planter comprising a hopper, a discharge tube communicating with and depending from said hopper, a furrow forming shoe below said hopper, a hollow shoe support depending from beneath said hopper about said tube, a tubular delivery conduit below said tube, means rockably supporting said delivery conduit, a valve plate carried by said delivery conduit and adapted in one position of the latter to close said discharge tube, a closure plate carried by said shoe adapted to close the lower end of said delivery conduit at the time that said valve plate is in closed position, an arcuate flange carried by said discharge tube for closing the upper end of said delivery conduit when said valve plate and said closure plate are in closed position, a spring normally rocking said delivery conduit to valve closing position, a check valve pivotally carried by said delivery conduit, an operating rod pivotally carried by said shoe support and connected to said check valve for closing the latter when said delivery conduit is in the valve opening position, and means for rocking said delivery conduit to valve opening position.

2. A seed planter comprising a hopper, a discharge tube communicating with and depending from said hopper, a furrow forming shoe below said hopper, a hollow shoe support depending from beneath said hopper about said tube, a tubular delivery conduit below said tube, mounting means connected to said delivery conduit intermediate the length thereof for rockably supporting said delivery conduit in said shoe support, a valve plate carried by said delivery conduit and adapted in one position of the latter to close said discharge tube, a closure plate carried by said shoe adapted to close the lower end of said delivery conduit at the time that said valve plate is in closed position, an arcuate flange carried by said discharge tube for closing the upper end of said delivery conduit when said valve plate and said closure plate are in closed position, an opening formed in the side wall of said delivery conduit, a check valve pivotally carried by said delivery conduit above said mounting means, an operating rod extending through said opening and pivotally connected at the opposite ends thereof to said shoe support and said check valve and adapted to dispose said check valve in seed catching position when said delivery conduit is in valve opening position, a spring normally rocking said delivery conduit to valve closing position, and means for rocking said delivery conduit to valve opening position.

EMRICH WEISHAAR.

REFERENCES CITED

The following references are of record in the file of this patent:

UNITED STATES PATENTS

| Number | Name | Date |
|---|---|---|
| 665,708 | Tunnicliff | Jan. 8, 1901 |
| 802,066 | Beall | Oct. 17, 1905 |
| 811,977 | Weaver | Feb. 6, 1906 |
| 1,089,590 | Schlicht | Mar. 10, 1914 |
| 1,252,923 | Moench | Jan. 8, 1918 |
| 1,306,153 | Krotz | June 10, 1919 |
| 1,328,730 | Dooley | Jan. 20, 1920 |
| 1,948,559 | Bohmker | Feb. 27, 1934 |
| 2,381,505 | Lindholm | Aug. 7, 1945 |